United States Patent Office 3,426,274
Patented Feb. 4, 1969

3,426,274
DIODE BRIDGE PROTECTION CIRCUITS FOR
ELECTRICAL MEASURING INSTRUMENTS
EMPLOYING THE DIODE FORWARD DROP
THRESHOLD VOLTAGE
David S. Wise, Warrensville Heights, Ohio, assignor to Western Reserve Electronics Inc., Cleveland, Ohio, a corporation of Ohio
Filed Nov. 19, 1964, Ser. No. 412,362
U.S. Cl. 324—110　　　　　　　　　　　　16 Claims
Int. Cl. G01r 1/36

ABSTRACT OF THE DISCLOSURE

An apparatus of protection of a load employing a diode bridge placed in shunt across supply lines. The output of the bridge is applied to a relay coil to open a switch in the supply lines when the forward threshold voltage of the diodes is exceeded.

---

This invention relates to protection systems for use in voltage, current and resistance measuring instruments wherein not only the instrument used for the measurement is protected, but action of the protection system is such that the device to which it is attached is protected. It is of the general character of that shown in the Frederick Patent No. 2,671,874.

In electrical measuring instruments, particularly those of the passive type, and which do not rely upon a source of current for their operation, it is well known that serious damage can occur should an attempt be made to use the instrument for measuring current or voltage which is beyond the range for which the instrument has been set. The above noted damage can cause destruction of the sensitive indicator, which could be a meter, or damage to the range extending resistors. In addition to the above, if the instrument was attached to certain devices, and set at the improper range, serious damage could occur to the device being measured which might cause a greater monetary damage to the device than that of the destruction of the measuring instrument. The damage to the device being measured could result in series consequences because of the difficulty of immediate replacement.

The protection system of the present invention is of the character where the protection is within definable limits and is extremely quick acting. It is one which, once it has operated can be reset many times, such resetting being substantially unlimited. It also has the advantage of being what may be termed "fail safe" because it is not dependent on the use of an internal voltage that could disappear. It functions solely because of the presence of power from within the measured system and requires no auxiliary source of power, which in the case of failure would leave the instrument unprotected.

Another aspect of the present invention is that the protection system has no effect on the measurement circuit until the range for which it is set is definitely exceeded.

Still other advantages of the invention, as well as the invention itself will become more apparent from the following description of some embodiments thereof.

The present invention will be described as applied to a volt-ohm-ampere measuring device and particularly in conjunction with such a device as is the subject matter of my copending applications Ser. No. 228,186, filed Oct. 3, 1962 and Ser. No. 310,385, filed Sept. 20, 1963, it will be apparent, however, that the device is useful in conjunction with other types of measuring instruments.

Figure 1:
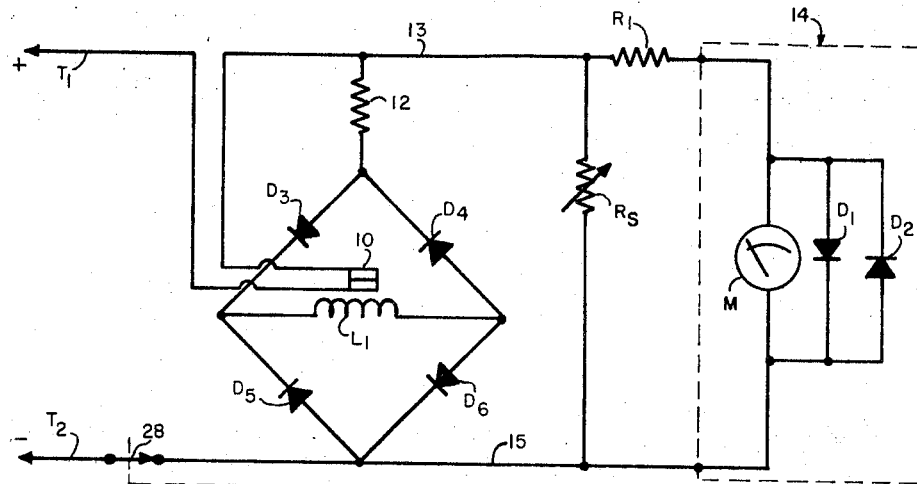
FIG. 1 is a schematic view of the circuit of the invention used in conjunction with a current measuring means.

Referring now to the drawings and particularly to FIG. 1, wherein the invention is used to protect a current measuring instrument, as is well known in the art, current is usually measured by placing a meter movement in series with the source of current and the apparatus utilizing the current. One of the required parameters of such a circuit is that it does not insert noticeable resistance losses in the circuit. The ranges of the measurements are determined by the resistances that are in shunt with the meter. The meter itself can be protected by the use of a pair of diodes, back to back, shunted around the meter which diodes conduct when the current exceeds a certain value. When this occurs, however, the load is placed on the shunt resistor and the protection must take over before the capabilities of the resistor are exceeded. The protection circuit operates to open the circuit by means of a magnetically operated bi-stable relay which has contacts disposed in at least one of the test leads, which when opened, disconnect the leads. The open circuit condition maintains until it is reset to the closed position.

In FIG. 1 the basis of such a system is illustrated. The test leads $T_1$ and $T_2$ are of the conventional type and are placed in series with the source of current and the load, neither of which is shown, but which is common procedure to those versed in the art. The test lead $T_1$ connects through a pair of closed contacts 10, and the line 13 to the meter circuit 14. The return is through the meter circuit, the line 15 and the test lead $T_2$.

The meter circuit may include a resistance $R_1$ in series with the meter circuit 14. A resistance $R_s$ is shunted across the meter circuit 14 and resistor $R_1$. This is illustrated, in the interest of simplicity, as a variable resistance but actually could be any one of a plurality of resistances placed across the meter and its resistor by a suitable switching means to determine the various ranges of the instrument. The meter movement M has its own protection circuit which consists of a pair of semi-conductor diodes $D_1$ and $D_2$, with a readily definable threshold of conduction, and a steep voltage resistance curve such as the silicon type, 1N645, in back to back configuration, shunted around the meter, the resistance $R_1$ being a current limiting resistance for the diodes.

It should be noted that these diodes have no measurable current shunting effect on the meter until the full scale indication of the meter is exceeded, at which time the current exceeds the threshold of conductivity of the diodes and suddenly start to conduct and reach a desired current limited condition. The resistor $R_1$ limits the current to the diodes to prevent their destruction. It still remains to disconnect the test leads to remove the load from the shunt resistor $R_s$ and resistor $R_1$.

Shunted across the leads 13–15 is a bridge circuit, each leg of which contains a diode and across which is a relay winding. The diodes in the upper arms are connected, the one $D_3$ to pass current in one direction and the other $D_4$ in the other direction. In the bottom arms the diode $D_5$, which is adjacent $D_3$ conducts in the opposite direction to $D_3$ while in the other lower arm diode $D_6$ conducts in the presence of normal current for the range being measured, none of the diodes conduct measurably or sufficiently to shunt measurable current. These diodes are of the same general character as the diodes $D_1$ and $D_2$ but may have higher surge current rating.

When the current exceeds a predetermined value, the threshold of conduction is exceeded and the current flows through the upper leg diode $D_3$, is blocked by $D_4$ and therefore flows through the relay winding $L_1$ and down through the diode $D_6$ and by way of the lead $T_2$ which completes the circuit. Obviously, if the instrument were connected into the circuit so that the polarity was wrong, nothing would happen unless the polarity exceeded the capabilities of the meter circuit, in which event the current flow would be by way of the diode $D_4$, winding $L_1$ and diode $D_5$ and being in the negative direction would still go through the winding $L_1$ from left to right.

Prior to this time the meter may have been off scale, but the meter is normally designed to handle a certain degree of overload until its protection takes over. When the current is above this, the characteristic curve of the diodes in the bridge is such that they suddenly conduct and the current through the relay winding $L_1$ is sufficient to cause the contacts to rapidly open. The relay is a bi-stable relay which is of the polarized type where contacts stay open until a suitable reverse current is applied to the windings. Such a relay is one where the points are sealed in an inert atmosphere and therefore it can be operated many times and has a very long life of the contacts. The latching is therefore non-mechanical and of the magnetic type. Such a relay may be one of the type manufactured by Sigma Instruments Inc,, called their Series 33 polarized DPDT magnetically biased.

Figure 2:
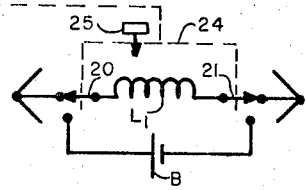
FIG. 2 is a fragmentary schematic view of a modification of FIG. 1.

In the interest of clarity of the description, the reset circuit for the relay is not shown in FIG. 1 but is shown separated from the circuit in FIG. 2. The ends of the coil $L_1$ are connected to two switch arms 20 and 21 which are operated simultaneously to move them into contact with terminals 22 and 23 by a linkage and push button 24 and 25, which connect the winding to a battery B which is of the proper polarity and voltage to cause a reverse current flow in the winding and which resets the contacts 10. Simultaneously with the operation of the switch arms 20–21 one of the test leads, such as $T_2$ is opened by a switch 28. This provides a safety factor, preventing the user from resetting the relay contacts without disconnecting the test leads from the circuit which caused the overload.

It will be appreciated that the resetting of polarized type of relay may be by other means, such as a movable magnet or its equivalent.

Figure 3:
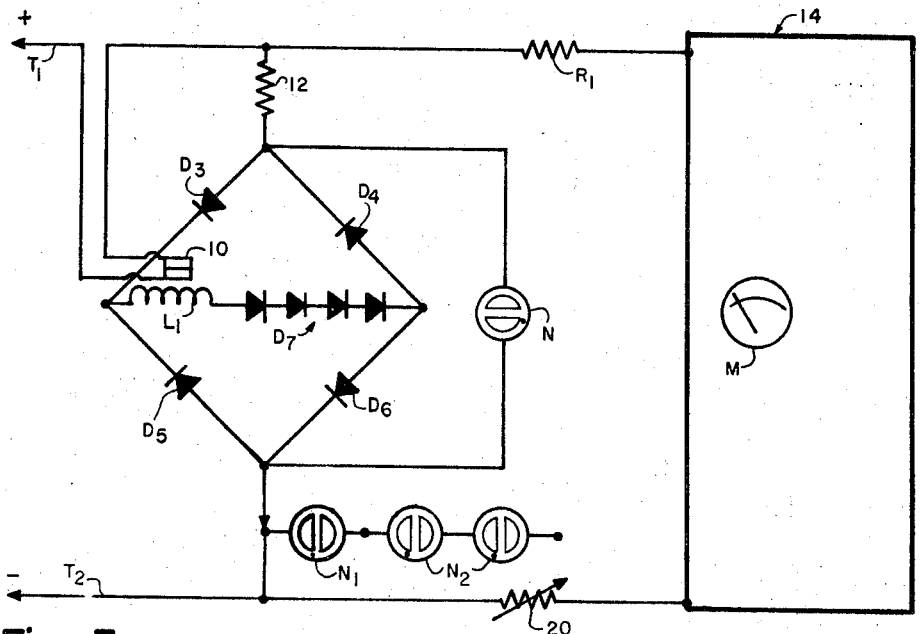
FIG. 3 is a schematic view of the invention used in conjunction with an instrument for measuring voltage.

The protection circuit as used in connection with the measurement of direct current voltages is shown in FIG. 3. It will be apparent that the circuit is the same basic configuration as that of FIG. 1, except for the added semiconductor diodes D7, which are in series with the winding $L_1$ for the purpose of raising the voltage at which conduction starts through the bridge. It will be apparent that the added series diodes could be replaced by a device, such as the well known Zener diode, connected in the direction of controlled avalanche. The winding $L_1$ on voltage measurements is one having a higher impedance.

A neon tube N is around the protection bridge to protect the non-conducting diodes against high reverse voltage surges which would destroy them. This neon tube is present in all the circuits but is only shown in the circuits where it actually functions. The value of the resistor 12 may be changed from that shown in FIG. 1 to a higher value as well as changed for different voltage ranges.

In measuring voltage, as is well known, the test leads $T_1$–$T_2$ are placed across the points where the voltage is to be measured. In this instance, the relay points 10 are in series with the lead and the meter M. So long as the voltage is within the range for which the circuit has been set, which is determined by the series range resistor 20, the bridge circuit and the neon tube N have no measurable current in them and therefore have no shunting effect on the input. Again, as in connection with the resistor $R_s$, the resistor 20 is shown as a variable resistor but, as well known in the art, it usually comprises a plurality of resistors which are inserted in the circuit stepwise by suitable switching means.

If it is assumed that the circuit is set for measuring a low voltage range, such as from .1 to 1 volt, the shunt bridge circuit has no effect in this range because there are in effect six diodes in series and there is not enough voltage to start conduction. Should an overload be applied, however, at about 25 volts, the circuit would conduct and the current in the winding $L_1$ would cause the contacts 10 to open, opening the circuit.

As the device is set for the higher ranges, such as 1–10 volts and 10–100 volts, the first neon lamp $N_1$ is added in series with the bridge and then two more $N_2$ to make a total of 3 neons in series with the bridge. This prevents the bridge from conducting in the presence of higher voltages. The lamps $N_1$ and $N_2$ are added at the same time as the insertion of the resistors at 20.

The resetting of the relay circuits can be the same as previously described.

Substantially the same circuit as described for the protection of the measuring means for direct current voltage may be used for protection for the measuring means for alternating current voltage. The meter circuit 14 is arranged for the measurement of alternating current and is of the character shown in my copending application Ser. No. 228,186, otherwise the operation is the same.

It will be apparent that the circuit of FIG. 1 can be used for protection in the measuring of alternating current by raising the threshold of conduction in the protection bridge by the same means as shown in FIG. 3, i.e., inserting the additional semi-conductors in series with the winding $L_1$.

At this time it is pointed out that this is one of the major improvements in the art, in that it is recognized that protection must be afforded against the application of alternating current to the test leads in the direct current ranges and conversely the alternating current ranges from the application of direct current.

Figure 4:
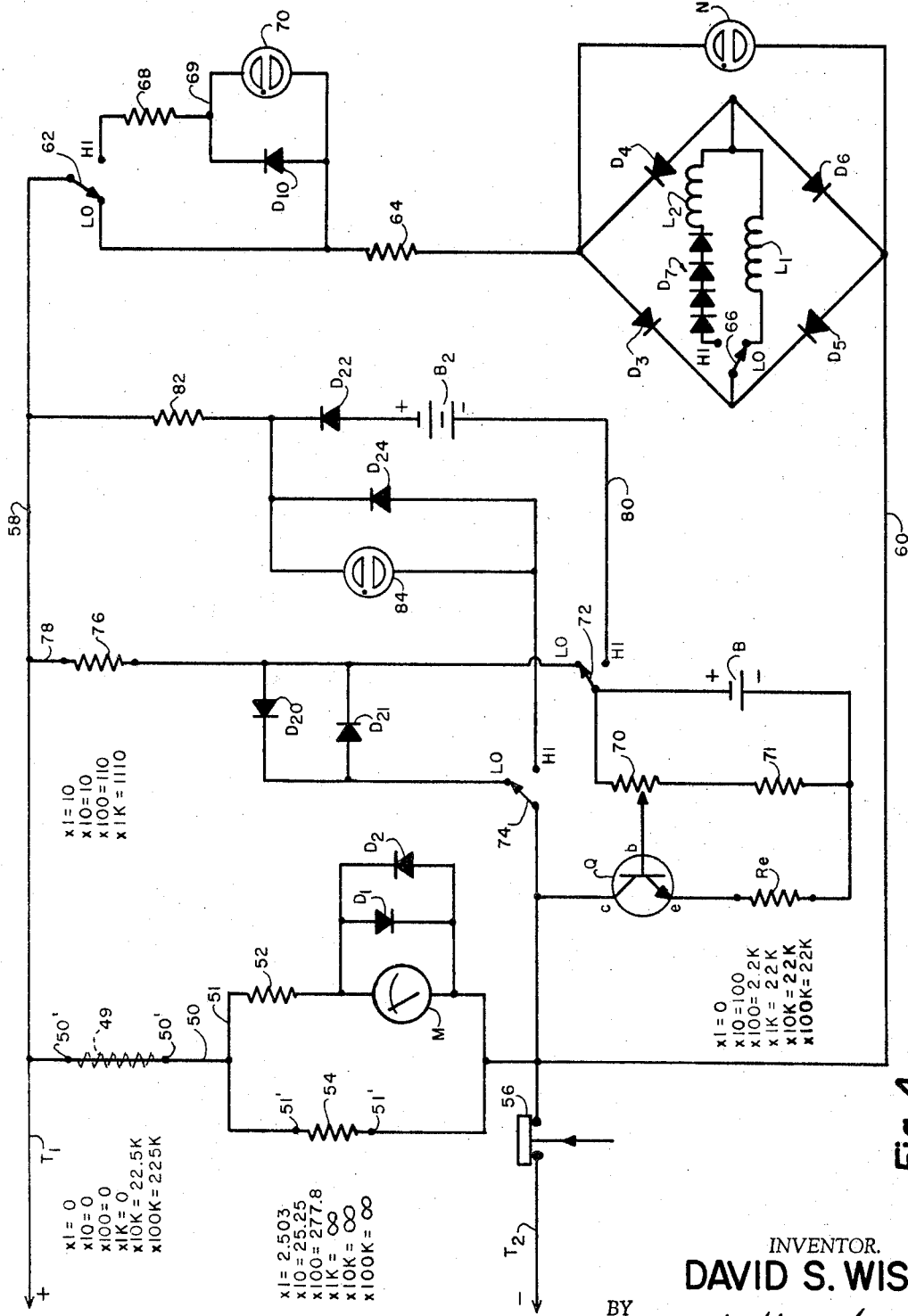
FIG. 4 is a schematic view of the invention as used in conjunction with a system for measuring resistance.

FIG. 4 shows diagrammatically a protection circuit in conjunction with a resistance measuring device of the character shown in my copending application Ser. No. 310,385, filed Sept. 20, 1963. In that application it was proposed to supply a safe current for measuring the resistance of an element or circuit under test and wherein the indicator or meter was disposed in shunt with the unknown resistance. The circuit therefore includes the indicator which must be protected and also the current generator which is also protected. In this circuit there is the protection of the indicator, which may be a meter. This throws the burden on the multiplier resistance. Next there is the protection which disconnects the test leads and protects the multiplier resistance, and then there is the protection of the current generator.

The test leads $T_1$ and $T_2$ have the meter circuit connected between them. The meter circuit includes the series range resistor 49, which in practice is actually comprised of separate resistors that are switched into the circuit on the higher ranges, as indicated. In the first four ranges the series resistance is eliminated, there being a direct connection in place thereof. Contacts 50′ are provided for the resistors.

The meter M is connected through a series resistor 52 and the line 51 to the line 50. Shunted around the meter are a pair of diodes $D_1$ and $D_2$ connected in opposite directions. Range shunt resistors 54 are connected across the combination of the meter and the resistor 52 by means of the contacts 51′, in the first three ranges. In the last three ranges the meter shunt circuit is open. It will be apparent that in the fourth range the resistance is only that of the meter and resistor 52. The means for switching the ranges is a multiple position switch, not shown, being well known in the art.

The diodes $D_1$ and $D_2$ protect the meter. They conduct when an over voltage is applied to the meter and thus protect the meter by shunting the current around the meter when it reaches a value which would damage the meter, as previously described. When this occurs, the load is thrown on the range resistors. This could cause damage to these resistors and therefore a shunt protection is provided across the test leads, the purpose of which is to disconnect the leads by means of the relay contacts 56 disposed in the test lead $T_2$ and operated by the winding $L_1$.

The lines 58 and 60 connect the test leads to the protection circuit. Line 58 connects to the swinger 62 of a two position switch. As indicated, this switch remains in the position shown for the first four ranges and connects test lead $T_1$ through the surge resistor 64 to the top of the protection bridge circuit which includes the diodes $D_3$, $D_4$, $D_5$ and $D_6$ connected as previously described, in the upper and lower arms of the bridge, the winding $L_1$ being connected across the diagonal through a single pole double throw switch 66. It will be apparent that should the voltage in the test leads be of such a value that it could cause damage to the range resistor, the diodes $D_3$ and $D_6$ would conduct upon one polarity and, the current in the winding $L_1$ will cause the relay contacts 56 to open. This will be on any of the four low ranges. On the two high ranges, the switches 62 and 66 are switched to their alternate position. At this time the switch 62 inserts a resistance 68 which is connected to a line 69 which has a diode $D_{10}$ and a neon lamp 70, connected in parallel into the connecting line ahead of the resistor 64. The diode $D_{10}$ is connected so that it presents high resistance to the flow of current from the line 58 to the protection circuit and is therefore, in substance, an open circuit at that time.

At the same time, on the two high ranges, the switch 66 connects the diagonals of the bridge through a series of four diodes $D_7$ and through a winding $L_2$ also in series. Therefore it can be seen that the above are both connected on the high range which is at the time the series range resistors are in the circuit with the meter and the meter shunt circuit is open. Thus protection is afforded for the meter on the two high ranges but the relay points do not open until the voltage, which is higher, exceeds the safe value.

In the two high ranges, as stated, the switch 62 places the combination of the current limiting resistor in conjunction with the diode $D_{10}$ and neon lamp 70 in series with the surge resistor 64 and the basic protection circuit. On these ranges if any undesired voltage is in the polarity indicated by signs at the test leads, there will be no start of conduction until it exceeds a certain value, for example, 100 volts. If the undesired voltage should be of the opposite polarity the combination would start to conduct at the threshold value of the series of diodes which include those in, through and in series with the bridge, for example, .8 volt. At some point above the values the current through winding $L_2$ is sufficient to trip the relay and the test leads then open. The protection circuit will operate at a low voltage D.C. if on opposite polarity to that shown and on a high voltage D.C. if in correct polarity. It will also operate at a low value A.C. The combination of diode $D_{10}$ and neon lamp 70 is a combination which allows conduction on high voltage in one direction and on a lower voltage in the other direction. There are certain equivalents that could be used, such as a Zener diode, but the combination specified is extremely economical as compared with other devices and has certain operational advantages, such a low leakage and high surge rating that make it desirable.

It is apparent that in the first four ranges the measuring circuit is in essence a direct current measuring instrument and with the protection circuit, which is shunted across the leads, is the same as that previously described for direct current measurement. In the two high ranges, it is the same as the voltage measuring circuit.

Protection is also afforded to prevent damage to the constant current generator which supplies the voltage to the element under test in event it should be connected to an element which has a potential drop across it.

As pointed out in the copending application Ser. No. 310,385, the voltage for the testing circuit is supplied through a constant current generator which includes the transistor Q which has its collector connected to the meter circuit and its emitter through a range resistor $R_e$ to the negative side of a battery B. The base of the transistor is biased negative by the potentiometer 70 in series with a resistor 71 disposed across the battery. A pair of diodes $D_{20}$ and $D_{21}$ are connected in opposite directions and in parallel with each other and in series with the positive battery terminal through a pair of two position switches 72 and 74 to the collector and hence the test leads. As will later appear, these two position switches are shifted on the two high ranges to increase the voltage in the generator, at which time the two diodes $D_{20}$ and $D_{21}$ and their current limiting resistor 76, which connects through the line 78 to the line 58, are removed from the circuit.

Should the test leads be connected to a source of voltage which would damage the current generator, the diode $D_{20}$ with its current limiting resistor would conduct and prevent damage thereto. The resistor 76 limits the current to the diode and causes it to go through the protection circuit by way of switch 62. Should the leads be connected to a device which was of the opposite polarity to the first mentioned connection, the diodes $D_{21}$ would conduct. Thus the current generator is protected on the four low ranges.

On the two higher ranges, as was pointed out in the last mentioned application, it is necessary to increase the battery voltage because, when the higher resistance is being measured, one or the other of the series range resistors are in the line 50 and in series with the meter. At this time the switches 72 and 74 are moved from the low range to the high range and, as stated, this removes the diodes $D_{20}$ and $D_{21}$ and resistor 76 from the circuit. At the same time an additional battery $B_2$ is connected in series with the battery B. It is apparent that because of increased battery voltage that the protection circuit should be arranged so that it will not cause the relay operation as it did on the low voltage and not operate until the internal voltage is exceeded. Switch 72 connects through the line 80 to the negative side of the battery $B_2$. The positive side of the battery $B_2$ then connects through a diode $D_{22}$ and through a resistor 82 to the line 58. Since the diode $D_{22}$ only conducts toward the line 58, any undesirable current in opposition to the current of the generator is caused to go into the bridge protection circuit. The neon lamp 84 fires when the voltage across the diode $D_{22}$ and the current generator reaches a value, such as 100 volts, in order that the voltage will not exceed the voltage rating of the diode, the lower end of the neon lamp 82 being connected to the test lead, through the switch 74.

Should the polarity be in the other direction, the diode $D_{24}$ would conduct, placing the burden on resistor 82. At this time there would also be a burden on the first series resistor at the input. Shortly thereafter as the voltage rises, the diodes in, through and in series with the bridge conduct and the current in the winding $L_2$ operates the relay contacts. Preferably the winding $L_1$ is of low impedance and that of $L_2$ of high impedance.

Figure 5:
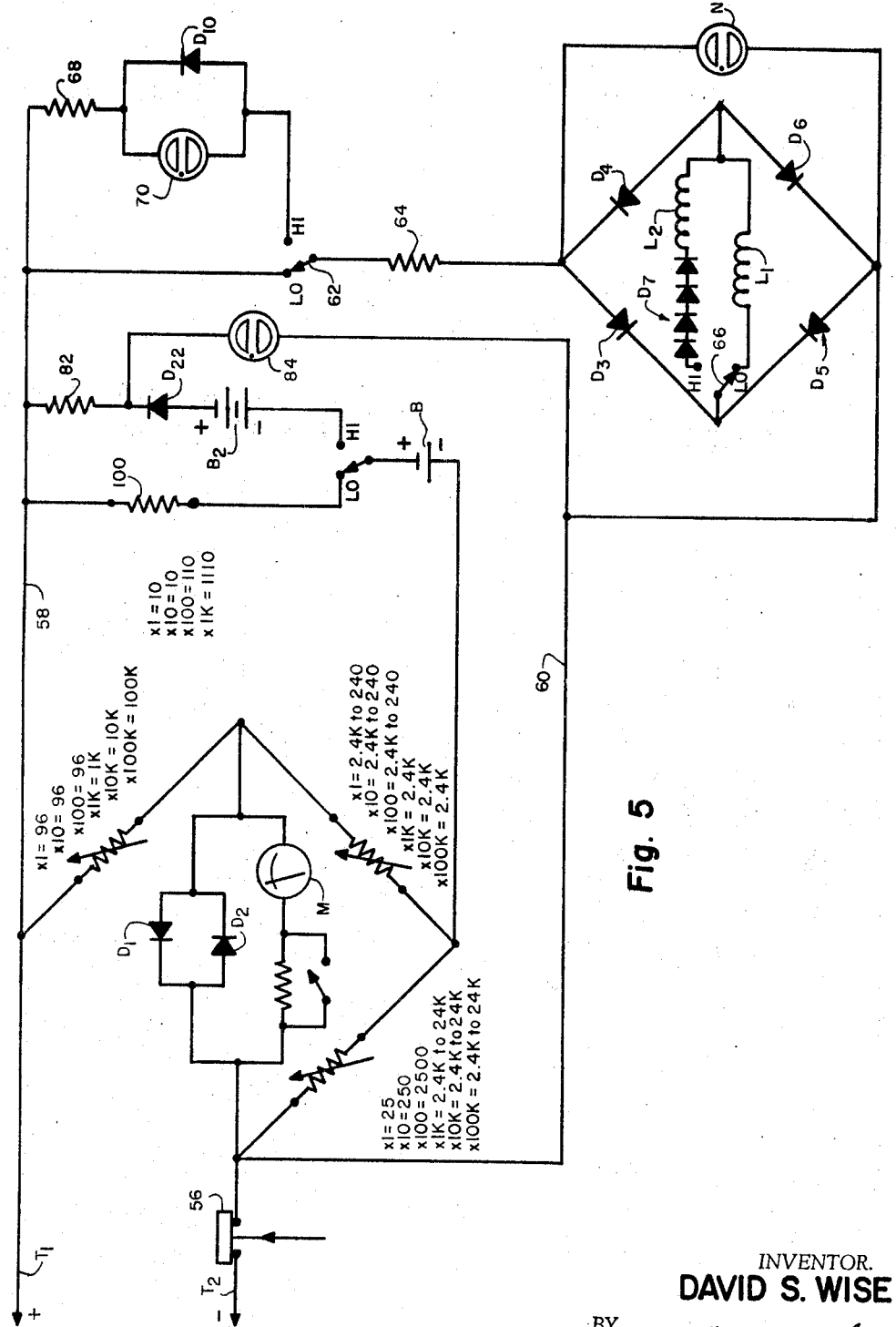
FIG. 5 is a schematic view of the system as used in conjunction with a resistance measuring device of the Wheatstone bridge type.

It will be apparent that a resistance measuring device, such as a Wheatstone bridge can be protected by the same means as just described. FIG. 5 shows such a device. The test leads $T_1$, $T_2$ are connected to one arm of the bridge across which the unknown resistance is to be inserted. An over voltage would cause an undesired load on the upper right arm, being through the diodes $D_1$ and $D_2$ which protect the meter M. If this voltage is of such a value as to cause damage to that resistance, the bridge protection circuit connected to the leads by conductor 58 and 60, is caused to operate, opening the contacts 56. The current limiting resistor 100 being in series with the battery B and the lower arms of the bridge limits the current to a value which can be sustained under these conditions.

On the higher range the switch 62 connects the diode $D_{10}$ and neon lamp 70 in series with the protection bridge. At the same time the winding $L_2$ and the diodes $D_7$ are connected across the bridge, thus making the protection circuit effective for the higher voltages in the presence of the additional battery $B_2$. As in the preceding case, the neon lamp and diode $D_{22}$ are inserted, along with battery $B_2$ and function as previously described.

I claim:

1. A protection circuit for protecting a voltage, current and resistance measuring circuit from overloads which comprises a pair of leads connected to the measuring circuit, polarized magnetically operated bi-stable switch means disposed in at least one of the leads and means to actuate said switch means consisting of a winding, a bridge circuit having a pair of upper adjacent arms connected to one of said leads and another pair of lower adjacent arms connected to the other of said leads, each of said arms having a diode therein and said winding being connected between the junctions of the upper with the lower arms of the bridge, said diodes being arranged to cause current conduction when the threshold voltage of the diodes is exceeded, first through one arm of the bridge, then through said winding, and then through the opposite arm of the bridge.

2. A device as described in claim 1, wherein said switch means is movable by current in one direction through said winding to open the switch and magnetic means is provided cooperating with the switch means to close the switch means.

3. A device as described in claim 2, wherein means is provided for causing current to flow in said winding in the opposite direction to the said current across the bridge to cause said switch contacts to close.

4. A device as described in claim 1, wherein said diodes are semi-conductors which do not conduct until the voltage applied thereto exceeds a predetermined value.

5. A device as described in claim 4, wherein semiconductor means is disposed in series with said winding to raise the voltage at which said winding is energized.

6. A system for the protection of a voltage, current and resistance measuring device having a pair of leads for connecting to a circuit element wherein the device is arranged to operate in different ranges by the insertion of voltage dropping elements in the measuring device including a meter movement, means to protect the meter movement against overload comprising, a pair of semiconductor elements in parallel with each other and connected for the conduction of current in opposite directions shunted around the meter movement and operable to divert current around the meter movement when the current is in excess of the safe capabilities of the meter, said semi-conductors having a steep voltage resistance characteristic and preventing a substantial flow of current around the meter movement until forced into a conductive state, means to protect said voltage dropping elements and open at least one of said connecting leads comprising a bridge circuit connected between the connecting leads, and having a pair of upper arms connected to one lead and a pair of lower arms connected to the other lead, each of said arms having a semi-conductor disposed therein and having the characteristic of a steep voltage resistance curve, said semi-conductors in the upper arms being conductive in opposite directions when in their conductive state and the semi-conductors in the lower arms being conductive in opposite directions to each other and to their adjacent upper arms, and a switch means disposed in at least one of said leads and being a polarized magnetically operated bi-stable device and means to actuate said switch arms including a winding disposed across the bridge between the junctions of the upper and lower arms and cooperating with said switch means to actuate the same, when the current across the bridge exceeds a predetermined value.

7. A system as described in claim 6, wherein unilateral conducting means is disposed in series with the winding across the bridge to decrease the voltage sensitivity of the bridge and raise the voltage at which conduction occurs through the bridge.

8. A system as described in claim 7, wherein glow discharge means is connected around and to the bridge to conduct current above a predetermined voltage.

9. A system as described in claim 7, wherein glow discharge means is arranged to be inserted in series with the bridge and at least one test lead to increase the voltage at which the bridge conducts.

10. A system as described in claim 9, wherein means is inserted between one of said test leads and said bridge and comprises a diode connected to block a current having a voltage of a predetermined high value applied in one polarity to the test leads and pass a current of a predetermined low value opposite to the first current applied to the test leads and glow discharge means is provided in parallel to said last diode to pass high voltage in either direction around said diode.

11. A protection circuit for a current, voltage and resistance measuring circuit including a pair of test leads, a relay having points that are magnetically operated and said points are connected in at least one of said test leads to open and close the lead, an indicator circuit connected to said test leads and including a meter movement, a pair of semi-conductor diodes connected in parallel for conduction in opposite directions and shunted across said meter movement, said diodes arranged to be substantially non-conducting for normal meter movement voltages and to conduct when the safe voltage for the movement is exceeded, shunt and series resistances arranged for insertion in said meter circuit, means to protect said resistances when their current rating is exceeded, comprising a protection circuit connected between saaid test leads and including a bridge circuit comprised of a pair of upper arms connected at adjacent ends to each other and with said ends connected to one of the test leads, a pair of lower arms having their adjacent ends connected to each other and said ends connected to the other test lead, the opposite ends of said upper arms connected to the opposite ends of the lower arms, a relay winding connected between the junctions of the upper arms with the lower arms, a semi-conductor diode disposed in each arm, and arranged to conduct upon application of a predetermined voltage to the test leads, said diodes being conducting in one direction through one set of opposite arms and in the other direction through the other set of opposite arms to cause current to flow in the same direction through the winding regardless of the polarity of the voltage applied to the test leads.

12. A device as described in claim 11, wherein said circuit is provided with current generating means connected to said test leads, a pair of semi-conductor diodes connected in parallel across said generating means and in opposite directions to each other, said diodes being non-conducting for normal currents from said generating means but being conducting upon application of a voltage of a predetermined value.

13. A device as described in claim 11, wherein said circuit is provided with voltage generating means connected to said test leads, means for preventing the application of a voltage to said generator comprising a first diode in series with said generator and arranged to conduct current away from the generator and to block current to the generator.

14. A device as described in claim 13, wherein a second diode is connected in shunt with the generator and arranged to block current coming toward the generator and pass current in the opposite direction and glow discharge means is provided in parallel with the last diode for passing current of a predetermined voltage in either direction.

15. A protection circuit for a multiple range electrical measuring instrument which has a pair of test leads and an indicator connected thereto and a current generator for generating a low voltage current in one set of ranges and for generating a higher voltage current in another set of ranges connected to said test leads, said protection system comprising a means shunted across said test leads and operable upon current at a voltage of a predetermined value accidentally applied to the test leads to open the test leads prior to the time the voltage would be such as to damage the current generator, and means to shift the generator voltage to the higher range and simultaneously shift the protection circuit to a higher range and cause said circuit to be non-conducting in the presence of the increased generator voltage and conducting upon accidentally applied voltage to the test leads of a value to damage the current generator.

16. A device as described in claim 2, wherein switch means is provided in at least one of said test leads to open the same and means is provided for operating said magnetic means and coupled to the last switch means for opening the circuit when the magnetic means is operated.

References Cited

UNITED STATES PATENTS

| | | | |
|---|---|---|---|
| 2,053,445 | 9/1936 | Rose | 317—52 |
| 2,282,344 | 5/1942 | Ruben | 317—52 |
| 2,584,800 | 2/1952 | Grisdale | 324—110 |
| 2,601,473 | 6/1952 | Van Weynsbergen | 317—31 |
| 2,671,874 | 3/1954 | Friedrichs | 324—110 |
| 2,769,131 | 10/1956 | Immel | 317—52 |
| 2,948,843 | 8/1960 | Klein | 317—16 |
| 3,001,101 | 9/1961 | Paddison | 324—119 |

RUDOLPH V. ROLINEC, *Primary Examiner.*

ERNEST F. KARLSEN, *Assistant Examiner.*

U.S. Cl. X.R.

324—119

UNITED STATES PATENT OFFICE
CERTIFICATE OF CORRECTION

Patent No. 3,426,274                                                            February 4, 1969

David S. Wise

It is certified that error appears in the above identified patent and that said Letters Patent are hereby corrected as shown below:

Column 1, line 43, "series" should read -- serious --. Column 2, line 68, after "conducts in the" insert -- opposite direction to the adjacent arm diode $D_4$. In the --. Column 8, line 39, "saaid" should read -- said --.

Signed and sealed this 17th day of March 1970.

(SEAL)
Attest:

Edward M. Fletcher, Jr.                                      WILLIAM E. SCHUYLER, JR.
Attesting Officer                                                    Commissioner of Patents